United States Patent [19]

Inabata

[11] Patent Number: 4,906,518
[45] Date of Patent: Mar. 6, 1990

[54] LIGHT FILLER MATERIAL HAVING DAMPING FUNCTION AND COMPOSITE MATERIAL THEREOF

[75] Inventor: Tadao Inabata, Tokyo, Japan

[73] Assignee: Inabata Techno Loop Corporation, Tokyo, Japan

[21] Appl. No.: 272,999

[22] Filed: Nov. 17, 1988

[30] Foreign Application Priority Data

Nov. 11, 1987 [JP] Japan ................................ 62-293100

[51] Int. Cl.$^4$ .............................................. B32B 7/02
[52] U.S. Cl. ..................................... 428/218; 428/283; 428/284; 428/285; 428/402; 428/404; 428/406; 428/256
[58] Field of Search .............. 428/218, 284, 283, 402, 428/406, 285, 256, 404; 501/32

[56] References Cited

FOREIGN PATENT DOCUMENTS 61-9830 1/1986 Japan .

Primary Examiner—James J. Bell
Attorney, Agent, or Firm—Lowe, Price, LeBlanc, Becker & Shur

[57] ABSTRACT

A filler material, having a light weight, an increased mechanical strength, and various excellent characteristics such as damping ability, as well as a composite material and a structural material thereof are provided. The filler material comprises mats made of alumina fibers, and layers of hollow silica-alumina-microspheres which are dispersed of and affixed to the associated mat, with the mats and the layers alternately stacked with each other. The composite material comprises a matrix of aluminum in which the above-mentioned filler material is filled. The structural material, which contains therein a predetermined amount of microspheres enough to provide the material with a desired vibration amplitude-frequency characteristic, is applied to a head arm for supporting a magnetic head of a disk device, for instance.

10 Claims, 3 Drawing Sheets

4,906,518

LIGHT FILLER MATERIAL HAVING DAMPING FUNCTION AND COMPOSITE MATERIAL THEREOF

BACKGROUND OF THE INVENTION

The present invention relates to a composite material having a light weight, increased mechanical strength and other improved material characteristics such as high damping ability, and a light filler material to be filled in the composite material, and more particularly to materials of these kinds containing therein fine granular additives (hereinafter referred to as microspheres), which are small in size and weight and high in heat resistance.

Recently, a number of light materials and light composite materials have been developed, which have improved material characteristics. However, it is still difficult to make materials of these kinds lighter in weight and at the same time higher in strength because of incompatability between these factors, by the use of conventional arts of selecting a specific combination of metallic constituents each having a considerably large density. Conventional composite materials such as ones containing carbon fibers are also insufficient in this respect. The present inventor proposed a light metallic composite material comprised of a matrix of a light metallic material and microspheres mixed in the matrix, as disclosed in Japanese Patent Application No. 9830/1986 (Japanese Provisional Patent Publication No. 170440/1987). However, it is difficult to disperse additives whose density differ from that of the matrix (the microspheres, for instance) uniformly in the matrix.

It has been also known to make electrical component parts such as a head arm for supporting a magnetic head of a disk device, and a printer head for movably receiving printing wires of a printer with the use of a damping material, so as to improve the performance of a device in which the electrical component part is mounted. For instance, a light head arm having an excellent damping ability, which is made of a high-porosity damping material, has been known. However, it is difficult to make a structural material for electrical component parts of this kind have a desired vibration amplitude-frequency characteristic.

SUMMARY OF THE INVENTION

An object of the present invention is to provide a composite material which is light in weight and high in mechanical strength and has other improved characteristics such as high damping ability, and a light filler material to be filled in this type of composite material.

Another object of the present invention is to provide a structural material, requiring a damping function, such as a head arm for supporting a magnetic head of a disk device, which material has a high damping ability, and in particular, which provides a desired vibration amplitude-frequency characteristic.

According to one aspect of the present invention, there is provided a filler material to be filled in a matrix. The filler material comprises at least one mat consisting of fibers having heat-resistance enough to withstand heating temperatures at which they are composited with the matrix, and fine granular additives dispersed on and affixed to the at least one mat, the additives having heat-resistance enough to withstand heating temperatures at which they are composited with the matrix and a density different from that of the matrix.

According to another aspect of the present invention, a composite material is provided, which comprises a matrix and a filler material of the above-mentioned type.

According to a further aspect of the present invention, a structural material having a damping function comprises a matrix and a filler material of the above-mentioned type, and contains therein a predetermined amount of the fine granular additives to have a desired vibration amplitude-frequency characteristic.

DETAILED DESCRIPTION

Figure 1:
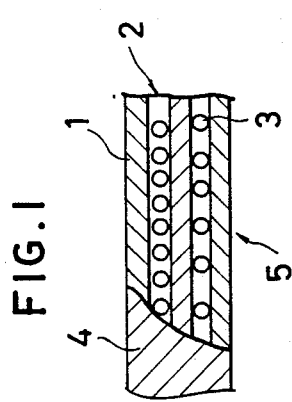
FIG. 1 is a fragmentary schematic sectional view showing a composite material according to a first embodiment of the present invention.

In FIG. 1, a composite material comprises a matrix 4 and a filler material 5 filled in the matrix and composited therewith. The filler material 5 has a plurality of mats 1 and a plurality of layers 2 of microspheres 3 as fine granular additives having a density different from that of the matrix, with the mats and the layers alternately stacked with each other. The microspheres 3 are dispersed on the mats 1 and affixed thereto.

The matrix 4 is composed of an element which is selected from a group consisting of: metals, preferably, light metallic materials, including aluminum, magnesium, zinc, copper, brass, bronze; metal alloys, preferably, light metal alloys, including an aluminum alloy; and synthetic resins. In this embodiment, the matrix of aluminum is employed.

The microspheres 3 are prepared in substantially the same manner as conventional microspheres or microcellular fillers, which have been recently developed as filler to be mixed in plastics and high molecular compounds and employed essentially for reinforcing materials of the kind having low mechanical strength and low melting point. For instance, the microspheres 3 are prepared by a melting method wherein pressurized air is ejected to a molten raw material so that the material is formed into fine particles each of which contains therein air bubbles, or by sintering method wherein a volatile component of granular raw material is vaporized to be contained in respective molten or softened granules during sintering process. However, as distinct from conventional ones, the microsphere 3 is composed of at least one element which is selected from a group consisting of: heat-resistant glasses having a high melting point, which include borosilicate glass, silica glass, silica-alumina glass, and silica-alumina-calcium glass; metals; and ceramic materials including silica, alumina and zirconia, so that the microsphere 3 has its softening point and melting point higher than those of conventional ones, and chemical stability to constituents of the matrix 4 such as Al, Mg, and Si. Further, in order to harmonize various characteristics of the resultant composite material such as lightness, strength, and damping ability, the microsphere 3 is prepared in a manner having a diameter less than 300 microns and formed into a hollow sphere filled with a gas such as air.

In the present embodiment, hollow silica-alumina microspheres are used, which are composed of 58–65 wt % silica, 28–38 wt % alumina and less than 4 wt % iron oxide. For instance, the microspheres have wall thickness 0.1 times their diameter, melting point of 1,200° C., bulk density of 408 Kg/m$^3$, pressure-resistance strength of 5,000 psi, and hardness of 5 Moh.

The mat 1 is composed of fibers, which are short in length and composed of an element selected from a group consisting of: heat-resistant glasses having a high melting point; ceramic materials; and metallic materials. Preferably, short fibers such as carbon fibers, aluminum fibers or whiskers are used. In this embodiment, alumina fibers composed of 72–95% alumina and 5–28% silica are employed for reinforcing purpose, and alumina fibers composed of 72% alumina and 28% silica are employed for heat-insulating purpose. Typically, these fibers have melting point of 1,600° C., true specific gravity of 3.0–3.5 g/cm$^3$ and fiber diameter of 3 microns.

Figure 2:
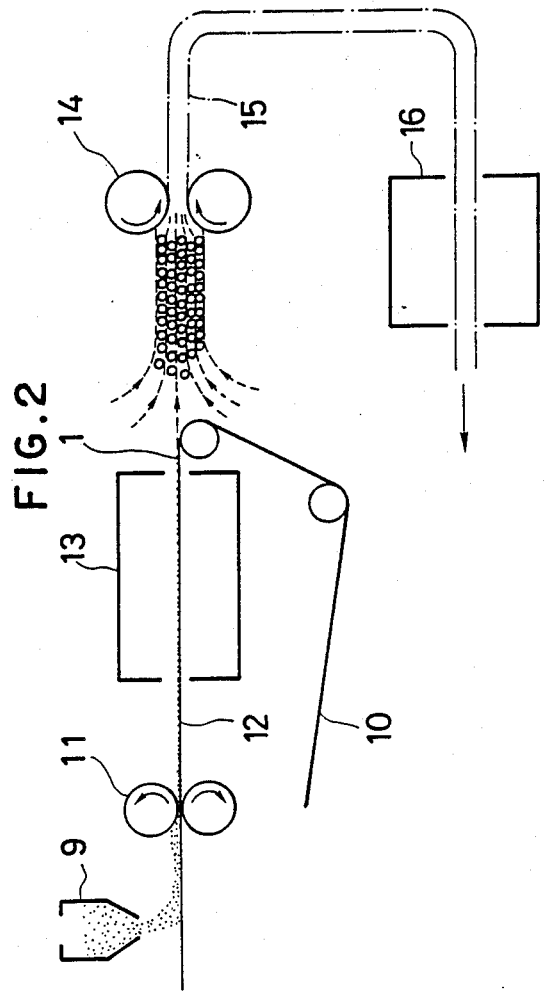
FIG. 2 is a schematic diagram showing a process of producing a filler material which forms part of the composite material of FIG. 1.

In manufacturing the filler material 5, as shown in FIG. 2, the above-mentioned short fibers are uniformly supplied from a hopper 9 on a belt conveyer 10, and firmly affixed to each other by means of rollers 11 to be formed into a sheet. The thus obtained sheet 12 is passed through a sintering furnace 13 to thereby obtain the mat 1. Alternatively, the mat 1 may be obtained by forming long fibers composed of one of the above-mentioned constituents into a net. In this case the long fiber net is sintered, where required.

Next, the microspheres 3 are uniformly dispersed on respective one side surfaces of a required number of the mats 1 which have been respectively prepared in the above-mentioned manner. Thereafter, these mats 1 are passed through rollers 14, with the mats 1 stacked to each other, so that the mats 1 are firmly affixed to each other to obtain a stacked body of the microspheres 3 and the mats 1, i.e., a composite mat 15. Further, the composite mat 15 is passed through a sintering furnace 16 so that the composite mat 15 is sintered, tempered, or softened to thereby firmly weld the respective microspheres 3 to associated mats 1. In this embodiment, the sintering temperature varies within a range of 900°–1,000° C. Finally, the thus obtained composite mat 15 is cut into a required length by the use of a cutter (not shown) to obtain the filler material 5.

In the following, an explanation will be given as to a method of manufacturing a composite material which uses the filler material thus obtained.

At first, the filler material 5 is disposed within a molding die (not shown). Then, a molten matrix 4 is poured into the die. At this time, in order to improve various characteristics of the composite material 5, preferably, the supplied amount of the molten matrix is set so that the ratio of the molten matrix to the microspheres 3 varies from 10:1, by volume, which corresponds to a limit for satisfying a lightening requirement of the composite material, to 10:7 corresponding to another limit for strengthening requirement of the same. When the molten matrix 4 is poured, the microspheres 3 are heated. These microspheres 3, which withstand the heating temperature and never be destroyed, are positively composited with the matrix 4. Further, since the microspheres 3 are affixed to the mats 1 beforehand in a uniform distribution, and, the mats 1, which also withstand the molten matrix temperature, positively hold the micropheres 3, the latter 3 never be separated upon pouring of the molten matrix 4, and are hence distributed uniformly in the matrix 4, which is different in density from the microspheres 3. To enhance the composition process, the molten matrix and/or the die may be pressurized, or the die may be depressurized. Thereafter, a composite bullet is obtained through cooling process. Further, the bullet is heated and subjected to various forming processes such as rolling and extrusion, and heat treatments such as quenching and tempering, if desired, to obtain a final product or the composite material 5.

Although the microsphere 3 itself cannot withstand unidirectional external force and is thus liable to be broken, it becomes mechanically stabilized against the external forces exerting along various directions when it is once mixed in the matrix 4 because of its outer spherical shape which makes the external forces to be balanced or canceled. Further, the gas filled in the interior of the microsphere 3 expands and contracts in volume with thermal expansion and contraction of the matrix 4, to provide the microsphere 3 with thermal stability. As a result, the microsphere 3 is kept stabilized in manufacturing process of the composite billet and subsequent forming processes, to be hardly broken or extinguished in the matrix 4. The resultant composite material having the microspheres 3 mixed therein and composited therewith is light in weight and high in strength and damping ability.

Figure 3:
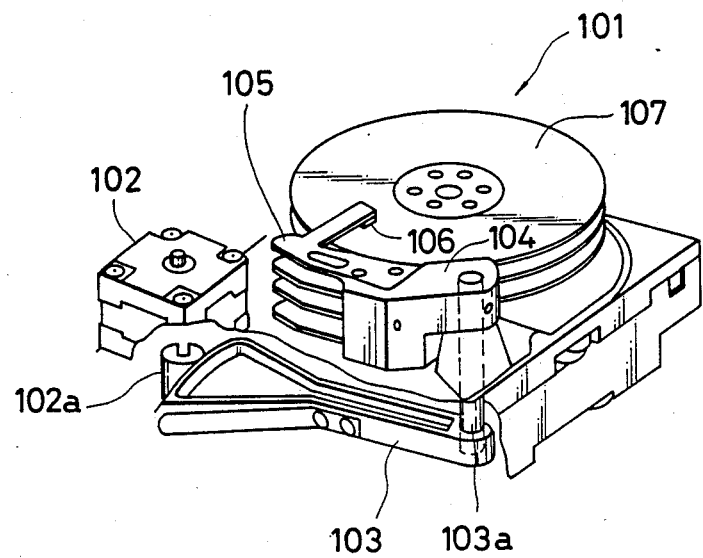
FIG. 3 is a schematic perspective view showing a head positioning mechanism of a disk device on which is mounted a head arm made of a structural material according to a second embodiment of the present invention.
Figure 4:
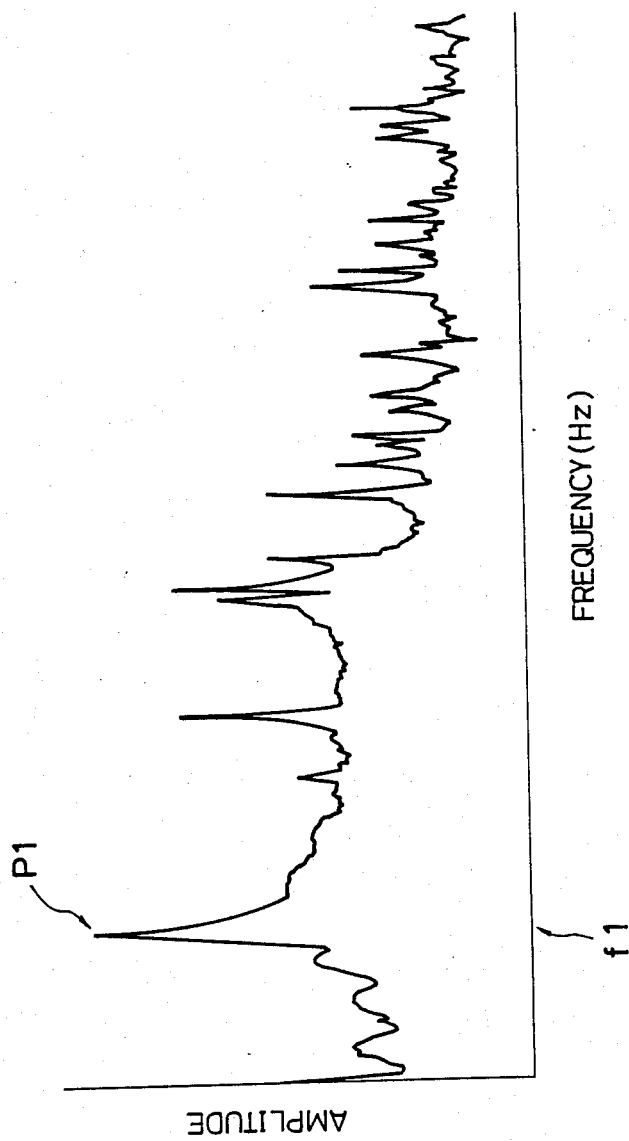
FIG. 4 is a view showing, by way of example, a vibration amplitude-frequency characteristic of a structural material for the head arm.

FIG. 3 shows a head positioning mechanism of a disk device, which is equipped with head arms comprised of a structural material according to a second embodiment of the present invention. For instance, as in a conventional arrangement, the positioning mechanism 101 comprises a swing arm 104 disposed on a pivot shaft 103a of a swingable actuator arm 103 which is coupled to a capstan 102a of a stepping motor 102. A magnetic head 106 is fixed to a tip end of a head arm 105 mounted on the swing arm 104. Reference numeral 107 denotes a magnetic disk.

The head arm 105 is comprised of a structural material which is obtained by filling a filler material corresponding to the filler material 5 of FIG. 1 in a matrix corresponding to the matrix 4 of FIG. 1, and thus the structural material for the head arm 105 corresponds to the composite material of FIG. 1. Therefore, explanations as to the matrix and the filler material which form the structural material will be omitted here.

The head arm 105 is produced in substantially the same manner as that (partly shown in FIG. 2) of the composite material of FIG. 1. A manufacturing process of the head arm 5 will be briefly mentioned hereinbelow.

At first, short fibers are affixed to each other in the form of a sheet, which is then sintered to obtain a mat corresponding to the mat 1 of FIG. 1. Then, a required number of the mats on which the microspheres are dispersed are affixed to each other to obtain a stacked body of the microspheres and the mats. Further, the resultant composite mat is sintered and is then cut into a required length to obtain a filler material corresponding to the filler material 5 of FIG. 1. Next, a molten matrix is poured into a die in which the filler material is disposed. At this time, in order to improve various characteristics of the head arm 105, in particular, to adjust the vibration amplitude-frequency characteristics of the head arm, the volume ratio of the supplied molten matrix to the microspheres is set to a predetermined value.

Then, as mentioned above with reference to FIG. 2, the resultant composite bullet is subjected to various forming processes and heat treatments, and is further subjected to shape-forming process such as cutting, punching to obtain a final product or the head arm 105. The resultant head arm 105 is light in weight and high in strength, and has an excellent damping ability. In particular, the vibration amplitude-frequency characteristic of the head arm 105 can be changed, together with density, Young's modulus, mechanical strength thereof, in dependence on an amount of the microspheres mixed in the head arm and physical properties of the microspheres such as diameter. More specifically, it is possible to reduce the magnitude of peaks (one of which is shown by P1) of vibration amplitude and cause the frequencies (one of which is shown by f1) at which the peaks appear (the frequencies of vibration of normal mode) to be inconsistent with a frequency of vibration generated by the stepping motor 102 and harmonic frequencies thereof. As a result, when the disk device is operated, vibration propagated from the motor 102 through actuator arm 103, etc., to the head arm 105 is greatly damped down in the head arm 105 containing therein the microspheres which are different in rigidity from the matrix and the mats.

The present invention is not limited to the above-mentioned embodiments, and various modifications may be made.

For instance, although the microspheres of hollow type are employed in the embodiments, microspheres of solid type may be employed. In this case, advantages similar to those of the hollow microspheres can be attained. Namely, the resultant composite material is decreased in weight due to a density difference between the matrix and the microsphere, and is provided with damping function due to a rigidity difference between these two components. Further, the microsphere may be formed into a shape other than a spherical shape, i.e., a clustered shape, for instance.

Further, a coating may be formed on the outer surface of the microsphere, which coating consists of a constituent selected from a group consisting of aluminum, zinc, copper, silver, iron, ferrite, etc., so as to improve mechanical strength of the microsphere itself and hence the resultant composite material, and preferably to provide the composite material with natures of multi-function material. In this case, upon manufacturing the composite material, the microspheres are cleaned and then floated and dispersed in an evaporation chamber to form the coating on the surfaces of the microspheres. At this time, by selecting the constituent of the coating having physical properties which are the same as or similar to those of the matrix, it is possible to improve material intimacy or wettability between the matrix component and the microsphere component, so as to improve the strength of the resultant composite material. Furthermore, a coating, which has one or more electromagnetic characteristics, such as electric conductivity, different from those of the matrix, may be employed to provide the composite material, as a whole, with a nature of a multi-function material. For instance, a magnetic coating and an electric conductive coating may be formed on the microspheres for use with non-magnetic matrix and non-conductive matrix, respectively.

In manufacturing the composite material, matrix powders may be employed in place of the molten matrix. In this case, the matrix powders are supplied into a molding die in which the filler material is disposed. Preferably, the supplied amount of the matrix is set so that the volume ratio of the matrix to the microspheres varies from 10:1 to 10:7. Then, the matrix and the filler material are heated up to a temperature at which at least part of the matrix is fluidized so that these two elements are composited with each other.

Although, in the preferred embodiment, the filler material are used where the mats and the microsphere layers are alternately stacked to each other, only a single microsphere layer may be formed on a single mat. The filler of this type is suitable to obtain a thin composite material.

In the second embodiment, the structural material of the invention is applied to the head arm. However, the invention is not limited thereto and is also applicable to a structural material which requires damping ability. Since the structural material of the invention containable therein a metallic component is also excellent in thermal conductivity, it is appropriately applied to a printer head, for instance.

Although the microspheres are dispersed on the completed mat in the manufacture of the head arm according to the second embodiment, the microspheres may be dispersed on and affixed to an associated one of fibers, which form a mat, beforehand, and the resultant fibers are used for formation of the mat.

According to the present invention, advantages listed below can be attained.

(i) Since a filler material comprises fine granular additives, having high heat-resistance, which are disposed on fibers having high heat-resistance, the filler material can be heated up to a temperature at which it is composited with a matrix, and hence the resultant composite material or a structural material has an increased mechanical strength.

(ii) Since the microspheres having a light weight are contained, the filler material and hence the composite material or the structural material is greatly reduced in weight.

(iii) Since the fine granular additives are affixed to the mat, the additives are uniformly dispersed in the filler material and hence in the composite material or the structural material, to improve the uniformity of these materials in their various characteristics.

(iv) Since the vibration amplitude-frequency characteristic of the structural material can be changed, together with density, Young's modulus, strength, by changing the associated parameters such as an amount of the fine granular additives to be mixed, a desired vibration amplitude-frequency characteristic can be attained with ease.

What is claimed is:
1. A composite material, comprising:
   a matrix; and
   a filler having at least one mat consisting of fibers and fine granular additives dispersed on and affixed to said at least one mat, said fibers and said additives each having heat-resistance enough to withstand heating temperatures at which they are composited with said matrix, respectively, said additives each having a density different from that of said matrix.

2. A composite material according to claim 1, wherein said composite material comprises a plurality of mats and a plurality of layers of fine granular additives, said mats and said layers being alternately stacked with each other.

3. A composite material according to claim 1, wherein each of said fine granular additives is formed into either a hollow sphere or a solid sphere.

4. A composite material according to claim 1, wherein each of said additives has a diameter less than 300 microns.

5. A composite material according to claim 1, wherein each of said additives consists of at least one element selected from a group consisting of heat-resistant glasses including borosilicate glass, silica glass, silica-alumina glass and silica-alumina-calcium glass; metals; and ceramic materials including silica, alumina and zirconia.

6. A composite material according to claim 1, wherein said matrix consists of an element selected from a group consisting of metallic materials including aluminum, magnesium, zinc, copper, brass and bronze; metal alloys including an aluminum alloy; and synthetic resins.

7. A composite material according to claim 1, wherein said fibers consist of an element selected from a group consisting of heat-resistant glasses having a high melting point; ceramic materials; and metallic materials.

8. A filler material to be filled into a matrix, comprising:
at least one mat consisting of fibers; and
fine granular additives dispersed on and affixed to said at least one mat;
said fibers and said additives having heat-resistance enough to withstand heating temperatures at which they are composited with said matrix, respectively, each of said additives having a density different from that of said matrix.

9. A structural material having a damping function, comprising:
a matrix; and
a filler material which comprises at least one mat consisting of fibers, and fine granular additives dispersed on and affixed to said at least one mat;
said fibers and said additives having heatresistance enough to withstand heating temperatures at which they are composited with said matrix, respectively;
said additives being mixed by a predetermined amount enough to provide said structural material with a desired vibration amplitude-frequency characteristic.

10. A structural material according to claim 9, wherein said structural material is used for a head arm for supporting a magnetic head of a disk device.

* * * * *

UNITED STATES PATENT AND TRADEMARK OFFICE
CERTIFICATE OF CORRECTION

PATENT NO. : 4,906,518
DATED : March 6, 1990
INVENTOR(S) : Tadao Inabata

It is certified that error appears in the above-indentified patent and that said Letters Patent is hereby corrected as shown below:

On title page, item [30] Foreign Application Priority Data, should read as follows:

--November 1, 1988 [JP] Japan....................63-274595--

Signed and Sealed this

Eighth Day of February, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO. : 4,906,518
DATED : March 6, 1990
INVENTOR(S) : Tadao INABATA

It is certified that error appears in the above-indentified patent and that said Letters Patent is hereby corrected as shown below: Title page:

Item [30] Foreign Application Priority Data, should read as follows:

--November 21, 1987 [JP] Japan . . . . . . 62-293100
 November 1, 1988 [JP] Japan . . . . . . . 63-274595--

Signed and Sealed this

Fourth Day of July, 1995

Attest:

BRUCE LEHMAN

Attesting Officer    Commissioner of Patents and Trademarks